(12) United States Patent
Shaw et al.

(10) Patent No.: US 8,311,869 B2
(45) Date of Patent: Nov. 13, 2012

(54) ALERT DISTRIBUTION AND MANAGEMENT SYSTEM AND INTERFACE COMPONENTS

(75) Inventors: Wen-Long Ronnie Shaw, Reston, VA (US); Patrick Charles Grady, Woodbridge, VA (US); Robert RP Patt-Corner, Cabin John, MD (US)

(73) Assignee: Noblis, Inc., Falls Church, VA (US)

( * ) Notice: Subject to any disclaimer, the term of this patent is extended or adjusted under 35 U.S.C. 154(b) by 553 days.

(21) Appl. No.: 11/984,280

(22) Filed: Nov. 15, 2007

(65) Prior Publication Data

US 2009/0132330 A1    May 21, 2009

(51) Int. Cl.
*G06F 17/00* (2006.01)
(52) U.S. Cl. ....................................... 705/7.22
(58) Field of Classification Search ........... 705/10, 705/7.22
See application file for complete search history.

(56) References Cited

U.S. PATENT DOCUMENTS

| | | | |
|---|---|---|---|
| 6,115,690 A | 9/2000 | Wong | |
| 2001/0056359 A1* | 12/2001 | Abreu | 705/3 |
| 2002/0111822 A1* | 8/2002 | Shimizu et al. | 705/1 |
| 2002/0156797 A1 | 10/2002 | Lee et al. | |
| 2003/0093328 A1 | 5/2003 | Koons | |
| 2004/0143518 A1 | 7/2004 | Siegel | |
| 2004/0267608 A1* | 12/2004 | Mansfield, Jr. | 705/14 |
| 2005/0038691 A1* | 2/2005 | Babu | 705/9 |
| 2005/0273369 A1 | 12/2005 | Ota et al. | |
| 2005/0283259 A1* | 12/2005 | Wolpow | 700/22 |
| 2006/0161392 A1* | 7/2006 | Sholl et al. | 702/183 |
| 2008/0262948 A1 | 10/2008 | Grady et al. | |
| 2009/0144104 A1 | 6/2009 | Johnson | |

OTHER PUBLICATIONS

International Search Report for PCT/US 07/23965 (mailed Nov. 25, 2008) (3 pages).
Written Opinion of the International Searching Authority for PCT/US 07/23965 (mailed Nov. 25, 2008) (4 pages).
Product Recall Services—Stericycle —Manufacturer Recall Services, etc., http://www.stericycle.com/product_recall_services.html, printed on Aug. 26, 2008 (1 page).
International Search Report for PCT/US2008/001996 (mailed Oct. 22, 2008) (3 pages).
Written Opinion of the International Searching Authority for PCT/US2008/001996 (mailed Oct. 22, 2008) (8 pages).
Office Action mailed on May 7, 2010, in co-pending U.S. Appl. No. 12/071,101, (14 pages).

(Continued)

*Primary Examiner* — Thomas Dixon
(74) *Attorney, Agent, or Firm* — Finnegan, Henderson, Farabow, Garrett & Dunner, LLP

(57) ABSTRACT

A method for distributing product alerts among a plurality of facilities is provided. The method includes receiving alerts, processing the alerts into an alert repository, providing an interface to an external system, receiving, via the interface, a request from the external system for an alert related to a product at the facility, extracting the alert from the alert repository, and sending, via the interface, the alert to the external system. A system for managing product alert handling at a facility is also provided. The system includes an alert processor and an interface component. The alert processor maintains a database. The interface component receives a request from an external system for alert handling data, retrieves the alert handling data from the database, sends the data to the external system, receives an action based on the data from the external system, and implements the action to manage alert handling at the facility.

19 Claims, 14 Drawing Sheets

OTHER PUBLICATIONS

International Preliminary Report on Patentability, mailed May 27, 2010, in PCT Application No. PCT/US2007/023965 (6 pages).
Final Office Action mailed on Oct. 25, 2010, in co-pending U.S. Appl. No. 12/071,101, (14 pages).
Office Action dated Apr. 27, 2011 in co-pending U.S. Appl. No. 12/071,101, 11 pages.
Office Action dated Jun. 8, 2011 in co-pending U.S. Appl. No. 12/385,399, 11 pages.
Office Action mailed on Dec. 23, 2010, in co-pending U.S. Appl. No. 12/385,399, (11 pages).
Jewler, "Reducing Patient Safety Risks Through Innovations in Managing Recalls," *Horizons Perspectives in Healthcare Management and Information Technology*, Fall, 2006, pp. 30-36.
"Management of Product and Device Alerts/Recalls and Other Related Hazards," *Mitretek Systems*, www.mitretek.org, pp. 1-5.
"Rasmas Data Collection Workbook Instructions," Jan. 25, 2007, 7 pages.
"Rasmas Overview—Revolutionizing Product Recall Management," *Mitretek Systems*, http://rasmas.mitretek.org, 13 pages.
"Risk and Safety Management Alert System—Implementation Guide," *Mitretek Systems*, http://rasmas.mitretek.orq, 45 pages.
Office Action, dated Oct. 12, 2011, for U.S. Appl. No. 12/071,101, filed Feb. 15, 2008 No. (11 pages).

* cited by examiner

RASMAS
RISK AND SAFETY MANAGEMENT ALERT SYSTEM

⌂HOME &MY PROFILE ⓘHELP ✉CONTACT ☒LOGOUT

RASMAS PORTAL

| RESPOND | COORDINATE | CLOSED ALERTS | ALL ALERTS |

WHY HEALTH CANADA ALERTS?

MANY RASMAS USERS LOCATED IN THE UNITED STATES HAVE ASKED IF THEY SHOULD CONSIDER HEALTH CANADA ALERTS IMPORTANT. THE ANSWER IS A RESOUNDING YES!

HEALTH CANADA HAS, ON SEVERAL OCCASIONS, RELEASED RECALLS AND OTHER PRODUCT ALERTS PRIOR TO THE ANNOUNCEMENT BY THE CORRESPONDING U.S. AGENCY, THE FDA. TWO EXAMPLES:

- RASMAS RELEASED ALERT #2006100344, A HEALTH CANADA NOTIFICATION OF A BECKMAN COULTER RECALL OF COULTER LH750 SERIES SYSTEM, ON OCTOBER 30, 2006. THIS RECALL WAS FOLLOWED BY A MORE COMPREHENSIVE RECALL NOTIFICATION BY THE FDA RELEASED BY RASMAS ALERT #2007030137 ON MARCH 12, 2007.

*RASMAS SUBSCRIBERS WHO ACTED ON THE HEALTH CANADA NOTICE AVOIDED 131 "AT RISK" DAYS.*

- RASMAS RELEASED ALERT #2007020045, A HEALTH CANADA NOTIFICATION OF A CIBA VISION RECALL OF SOFT CONTACT LENSES, ON FEBRUARY 7, 2007. THIS RECALL WAS FOLLOWED BY A MORE COMPREHENSIVE RECALL NOTIFICATION BY THE FDA RELEASED BY RASMAS ALERT #2004020301 ON FEBRUARY 22, 2007.

*RASMAS SUBSCRIBERS WHO ACTED ON THE HEALTH CANADA NOTICE AVOIDED 15 "AT RISK" DAYS.*

WELCOME CARL JAMES

YOUR ALERT STATUS
| | NAME | | RESPONSE | | COORDINATION | | MANAGEMENT | |
|---|---|---|---|---|---|---|---|---|
| ◉ | JAMES, CARL | ○ | 0 | ○ | 5 | ○ | 0 | |

PEOPLE YOU CAN BACKUP
| | NAME | | RESPONSE | | COORDINATION | | MANAGEMENT | |
|---|---|---|---|---|---|---|---|---|
| ○ | ANDERSON, MARK | ○ | 1 | ○ | 55 | ○ | 175 |
| ○ | CLARKSON, JOAN | ○ | 1 | ○ | 44 | ○ | 0 |
| ○ | DONALDSON, HAROLD | ○ | 1 | ○ | 0 | ○ | 0 |
| ○ | SCHEIBLE, JILLRM | ○ | 1 | ○ | 0 | ○ | 175 |

PEOPLE WHO CAN BACK YOU UP
NAME
DONALDSON, HAROLD
MILLER, LEE

LEGEND
*NUMBERS INDICATE COUNTS OF ALERTS (NOT ASSIGNMENTS)*
○ ALL ALERTS ARE ON TIME.
○ AT LEAST ONE ALERT IS CURRENTLY DELAYED OR ESCALATED.

QUICK LINKS

- HOW TO SUBMIT AN ALERT
- UPDATE MY PROFILE
- DOMAIN DEFINITIONS (pdf)
- MEDWATCH REPORTING FORM
- TRAINING
- REPORT TUTORIAL (FLASH FILE)
- ADD RASMAS TO MY FAVORITES

REMINDER
PLEASE REMEMBER TO INCLUDE A COVER PAGE WHEN FAXING AN ALERT TO RASMAS SO THAT WE CAN CONTACT YOU IN CASE WE HAVE QUESTIONS.

FIG. 4a

RASMAS
RISK AND SAFETY MANAGEMENT ALERT SYSTEM

⇧ HOME & MY PROFILE ⊕ HELP ✉ CONTACT ☒ LOGOUT

COORDINATE ALERTS

| RESPOND | COORDINATE | CLOSED ALERTS | ALL ALERTS |

THIS LIST CONTAINS 5 ALERTS.

SHOW ONLY: ALL ▾    SORT ALERTS BY: ALERT ID ▾ (GO)    SEARCH: [ ] (GO)    UPLOAD NEW ALERT CHECKED    CLOSE (⊗)

| ALERT ID (RELEASE DATE) | ALERT TYPE | DOMAIN | DESCRIPTION/MANUFACTURER/REASON | DISTRIBUTION | ALERT STAGE | ALERT STATUS | SELECT FOR CLOSE |
|---|---|---|---|---|---|---|---|
| 2007050271 (5/16/2007 18:41 EDT) | RECALL | BLOOD PRODUCTS | RED BLOOD CELLS AMERICAN NATIONAL RED CROSS, PENN-JERSEY REGION, PHILADELPHIA, PA, BLOOD PRODUCTS, COLLECTED FROM AN UNSUITABLE DONOR DUE TO A HISTORY OF HEMOCHROMATOSIS, WERE DISTRIBUTED. | NJ | NO ASSIGNMENTS | ESCALATED | ☐ |
| 2007050260 (5/16/2007 18:41 EDT) | RECALL | BLOOD PRODUCTS | PLATELETS, PHERESIS, LEUKOCYTES REDUCED AMERICAN NATIONAL RED CROSS, PACIFIC NORTHWEST REGION, PORTLAND, OR BLOOD PRODUCTS, WHICH WERE MISLABELED AS TO HLA TYPE, WERE DISTRIBUTED. | ID, OR, AND WA | NO ASSIGNMENTS | ESCALATED | ☐ |
| 2007050258 (5/16/2007 18:41 EDT) | RECALL | BLOOD PRODUCTS | RED BLOOD CELLS AND FRESH FROZEN PLASMA AMERICAN NATIONAL RED CROSS, PACIFIC NORTHWEST REGION, PORTLAND, OR BLOOD PRODUCTS, WHICH TESTED NEGATIVE FOR HEPATITIS B SURFACE ANTIGEN (HBsAg) AND FOR THE ANTIBODY TO HEPATITIS B CORE ANTIGEN (anti-HBc), BUT WERE COLLECTED FROM A DONOR WHO PREVIOUSLY TESTED POSITIVE FOR HBsAg, WERE DISTRIBUTED. | OR AND CA | NO ASSIGNMENTS | ESCALATED | ☐ |
| 2007050253 (5/16/2007 12:58 EDT) | RECALL | BLOOD PRODUCTS | RED BLOOD CELLS, LEUKOCYTES REDUCED AMERICAN NATIONAL RED CROSS, NORTHEASTERN PENNSYLVANIA REGION, ASHLEY, PA. BLOOD PRODUCTS, WHICH DID NOT MEET THE QUALITY CONTROL REQUIREMENTS FOR DISTRIBUTION, WERE DISTRIBUTED | OK AND MD | NO ASSIGNMENTS | ESCALATED | ☐ |
| 2007050245 (5/16/2007 12:58 EDT) | RECALL | BLOOD PRODUCTS | RED BLOOD CELLS AND FRESH FROZEN PLASMA UNITED BLOOD SERVICES, MERIDIAN, MS BLOOD PRODUCTS, COLLECTED FROM DONORS WHO MAY HAVE RECEIVED INAPPROPRIATE ARM PREPARATION, WERE DISTRIBUTED. | AL, MS, AND UK | NO ASSIGNMENTS | ESCALATED | ☐ |

FIG. 4b

RASMAS
RISK AND SAFETY MANAGEMENT ALERT SYSTEM

⌂ HOME ☒ MY PROFILE ⊕ HELP ☒ CONTACT ☒ LOGOUT

ALERT DETAIL

| | RESPOND | COORDINATE | CLOSED ALERTS | ALL ALERTS |

- ⊙ ASSIGN RESPONSE
- ⊙ REASSIGN COORDINATOR
- ⊙ ADD WORK NOTE
- ⊙ SEND FYI E-MAIL
- ⊙ CLOSE COORDINATION

| ALERT DETAILS FOR #2004050260 (RELEASED 5/16/2007 18:41 EDT) |
|---|
| DESCRIPTION: PLATELETS PHERESIS, LEUKOCYTES REDUCED |
| MANUFACTURER: AMERICAN NATIONAL RED CROSS, PACIFIC NORTHWEST REGION, PORTLAND, OR |
| REASON: BLOOD PRODUCTS, WHICH WERE MISLABELED AS TO HLA TYPE, WERE DISTRIBUTED. |
| ANALYST COMMENTS: PLEASE CLICK ON THE HYPERLINK TO VIEW NOTIFICATION DETAILS DATED JUNE 2, 2004. CONTACT AMERICAN RED CROSS: (202) 303-8150. |

SEARCH [GO]

| ALERT TYPE: RECALL | SOURCE ALERT TYPE: FDA CLASS III |
|---|---|
| DOMAIN: BLOOD PRODUCTS | SOURCE TYPE: FDA ENFORCEMENT REPORT |
| DISTRIBUTION: ID, OR, AND WA | SOURCE DATA: 5/16/2007 |

LINKS: FDA ENFORCEMENT REPORT WEBSITE - http://www.fda.gov/po/enforceindex/2007enforce.html
SHIFT-CLICK TO OPEN IN NEW WINDOW: AMERICAN RED CROSS WEBSITE - http://www.redcross.org/where/chapts.asp

PRODUCT INFORMATION                                          HIDE ☐ DETAILS

| PRODUCT DESCRIPTION | MODEL/PRODUCT NUMBER | STOCK IDENTIFIERS | VOLUME | RECALL ID |
|---|---|---|---|---|
| (a) PLATELETS PHERESIS, LEUKOCYTES REDUCED. | NOT SPECIFIED | (a) UNIT: 21FP124671. | 5 UNITS TOTAL. | B-1283-07 |
| (b) PLATELETS PHERESIS, LEUKOCYTES REDUCED, IRRADIATED. | NOT SPECIFIED | (b) UNITS: 21KP08121, 21P86715 (2 UNITS), 21P83001. | 5 UNITS TOTAL. | B-1284-07 |

WORK ASSIGNMENTS & NOTES                                    HIDE ☐ DETAILS

| ASSIGN RESPONSE | REASSIGN COORDINATOR | STATUS | STAGE | ADD WORK NOTE | SEND FYI E-MAIL | CLOSE COORDINATION | COORDINATOR GUIDANCE | ACTION TAKEN |

TESTING FACILITY 1

| NAME | STATUS | STAGE | | | | | | |
|---|---|---|---|---|---|---|---|---|
| JAMES, CARL | ☐ ESCALATED | NO ASSIGNMENTS 5/16/2007 18:44 EDT | | | | | | |

*FIG. 4c*

Microsoft Internet Explorer

EXTERNAL SYSTEM - [ RASMAS ALERT EDIT - 2007040099 ]  LOGOUT

WORK ORDERS  ASSETS  PM/PE  MATERIALS  PURCHASING  REPORTING  MODULES  TOOLS  SETUP  HELP

LIST | MAIN | ITEMS AND LINKS | WORK ORDERS

ALERT DETAILS FOR #2007040099 (RELEASED 4/10/2007 12:05:05 AM)

DESCRIPTION: IMMUNOASSAY ANALYZER COMPONENT.
MANUFACTURER: ABBOT LABORATORIES INC., IRVING, TX.
REASON: CLAMP CAN CAUSE MISALIGNED SEATING OF HEATER BLOCK RESULTING IN INACCURATE DISPENSION OF MEIA WASH BUFFER OR MUP INTO THE REACTION CELL, CAUSING INCONSISTENT RESULTS.

ANALYST COMMENTS:
DESTRIBUTION: NATIONWIDE, INTERNATIONALLY

RELEVANCE

SEGMENT: 1 - FACILITIES SEGMENT
ALERT TYPE: RECALL
DOMAIN: BIOMEDICAL DEVICES
DATE RECEIVED: 4/18/2007 8:03:00 PM
SOURCE ALERT TYPE: FDA RECALL CLASS II
SOURCE TYPE:
SOURCE DATE: 4/18/2007 8:03:00 PM

COMPLETE ALERT

ACTION TAKEN:
ACTION TAKEN TEXT:
DATE COMPLETED:

FIG. 7

| <<service>> |
| --- |
| RasmasWSMgr |
| +getAlert(alertId : Long) : Alert<br>+getAlerts(alertIds : Long[]) : Alert[]<br>+searchAlerts(searchStr : String) : Alert[]<br>+getCoordinationAssignments(facilityId : Long) : CoordinationAssignment[]<br>+getCoordinationAssignment(coordinationAssignmentId : Long) : CoordinationAssignment<br>+reassignCoordinationAssignment(coordinationAssignmentId : Long) : void<br>+makeResponseAssignment(coordinationAssignmentId : Long, actionReqId : Integer, actionReqText : String) : ResponseAssignment<br>+completeResponseAssignment(actionTakenId : Integer, actionTakenText : String, respAssignmentId : Long) : void<br>+closeCoordinationAssignment(coordinationAssignmentId : Long, actionTakenId : Integer, actionTakenText : String) : void<br>+addNote(coordinationAssignmentId: Long, note : String) : void |

*FIG. 8a*

<<service>> RasmasWSUserMgr

+ createUser(newUser : User) : void
+ disableUser(userId : Integer) : void
+ changePassword(oldPassword : String, newPassword : String, userId : Integer) : void
+ changeRole(roleId : Integer, userId : Integer) : void
+ getrUser(userId : Integer) : User
+ getUser() : User[]

FIG. 8b

<<service>> RasmasWSAccountMgr

+ setFacilityDomainRouting(facilityId : Integer, coordinatorId : Integer, domainId : Integer, isEnabled : Boolean) : void
+ setAccountEscalationParameters(accountId : Integer, phaseOne : Integer, phaseTwo : Integer, phaseThree : Integer, facilityMgrEscalate : Integer, accountMgrEscalate : Integer) : void
+ updateDesignatedAccountManager(accountId : Integer, userId : Integer) : void
+ udateDesignatedFacilityManager(facilityId : Integer, userId : Integer) : void

FIG. 8c

ALERT DISTRIBUTION AND MANAGEMENT SYSTEM AND INTERFACE COMPONENTS

FIELD OF THE INVENTION

The present invention relates generally to an enterprise application. More particularly, the present invention relates to exposing functionality of an alert distribution and management system to an external system.

BACKGROUND OF THE INVENTION

When a manufacturer determines that a product is defective, the manufacturer may issue an alert (e.g., a recall notice, field correction, repair instructions, etc.) to notify customers to stop using the product, return the product, etc. Issuing an alert is costly to a manufacturer because an alerted product may need to be replaced or fully refunded, but it often limits liability for a manufacturer and prevents further damage to manufacturer's corporate image. A product alert is not, however, easy to learn about because, for example, a manufacturer may not always publicize an alert. A manufacturer may merely notify a government agency, and it is often a consumer group that publicizes an alert that the group learns from the agency. Further, a customer may have hundreds or thousands of products to search for alerts on.

The current process used by many organizations to obtain and manage product alerts (e.g., product recalls and bulletins) may thus be seriously flawed. There may be multiple alert sources and formats and diverse methods of alert distribution to the organizations. The process may rely on poorly functioning paper-based systems. Critical alerts may often be mishandled or lost. Weeks may pass before recalled products may be disposed. Timely information regarding the status of the alerts may not be available.

The problems with the business process of alert management fall into three general areas: organization, infrastructure, and process. Organizationally, alert management may often be performed by individual departments in an organization. For example, a hospital may expect each department (medical devices, food service, pharmacy, etc.) to process recalls for relevant products. There may be no overall coordination and responsibility for alert management and no assurance that all departments are covered. The infrastructure may tend to consist of manual mechanisms, such as receiving recall notices by mail. The manual mechanism may not support efficient workflow or timely, comprehensive reporting. The process may be fragmented and inconsistent across the organization. Determining accountability may often be difficult, and there may not be an easy way to ensure appropriate actions have been taken. Many recalls may be missed or may be implemented too slowly.

SUMMARY OF THE INVENTION

An alert distribution and management system using information technology may alleviate the alert management problems. One example of an alert distribution and management system may be the Risk and Safety Management Alert System (RASMAS™) from Noblis. The alert distribution and management system may provide organizations with a new infrastructure for alert management.

In an alert distribution and management system consistent with embodiments of the present invention, alerts may be managed within an enterprise-wide organization including a management structure and responsibilities. Management may assure that the full range of relevant product domains (e.g., departments or categories of products) may be addressed. The alert distribution and management system may also have an automated infrastructure to support effective workflow and provide immediate and comprehensive reporting. An alert distribution and management system may include a repository containing a full history of actions taken in response to an alert, and the repository may enable audits and reviews of the actions. The process may be comprehensive and standardized across the organization. Management may monitor adherence to the process and to the organizational standards, and accountability may be well-defined.

In certain embodiments, rather than implementing a full scale alert distribution and management system, an existing external system may be modified or a new external system may be developed to communicate with an existing alert distribution and management system. The external system may use the rich functionality and resource of the existing distribution and management system without having to develop the functionality and acquire the resource on its own. The external system may provide interfaces to its own set of users, and therefore the functionality and resources of the distribution may be customized for the specific needs of its users.

To facilitate this integration, methods and systems consistent with embodiments of the present invention expose functionality of an alert distribution and management system to an external system. To accommodate external systems using various technologies, certain interface methods are independent of the technologies that the external system may employ.

Consistent with embodiments of the invention, a method for distributing product alerts among a plurality of facilities is provided. The method includes receiving alerts related to products. The method also includes processing the alerts into an alert repository. The method further includes providing an interface to an external system separate from the alert repository, the external system being accessed by a facility having one or more of the products. The method further includes receiving, via the interface, a request from the external system for an alert related to a product at the facility. The method further includes extracting the alert related to the product from the alert repository. The method further includes sending, via the interface, the extracted alert to the external system.

In another embodiment, a method for managing product alert handling at a facility is provided. The method includes maintaining, by an alert processor, a database including data related to alert handling at the facility. The method also includes receiving, via an interface, a request for alert handling data from an external system for the facility, the external system being external to the alert processor, the request including a data identifier. The method further includes retrieving the alert handling data corresponding to the data identifier from the database. The method further includes sending, via the interface, the retrieved alert handling data to the external system for the facility. The method further includes receiving, via the interface, an action based on the alert handling data from the external system. The method further includes implementing the action to manage alert handling at the facility.

In yet another embodiment, a system for managing product alert handling at a facility is provided. The system includes an alert processor that maintains a database including data related to alert handling at the facility. The system also includes an interface component separate from the alert processor. The interface component receives a request from an external system for alert handling data, the external system being external to the alert processor and accessed by the facility, the request including a data identifier. The interface component also retrieves the alert handling data corresponding to the data identifier from the database. The interface component further send the retrieved alert handling data to the external system. The interface component further receives an action based on the alert handling data from the external system. The interface component further implements the action to manage alert handling at the facility.

It is to be understood that both the foregoing general description and the following detailed description are exemplary and explanatory only, and should not be considered restrictive of the scope of the invention, as claimed. Further features and/or variations may be provided in addition to those set forth herein. For example, embodiments consistent with the present invention may be directed to various combinations and subcombinations of the features described in the following detailed description.

BRIEF DESCRIPTION OF THE DRAWINGS

The accompanying drawings, which are incorporated in and constitute a part of this specification, illustrate various embodiments and aspects of the present invention. In the drawings:

FIGS. 4A-4C are screen displays of an exemplary web application of an alert distribution and management system consistent with embodiments of the present invention;

FIG. 7 is a screen display of an exemplary web-based user interface of an external system consistent with embodiments of the present invention;

FIGS. 8A-8C are class diagrams of exemplary service objects available in interface components consistent with embodiments of the present invention;

DESCRIPTION OF THE EMBODIMENTS

Reference will now be made in detail to the invention, examples of which are illustrated in the accompanying drawings. Implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
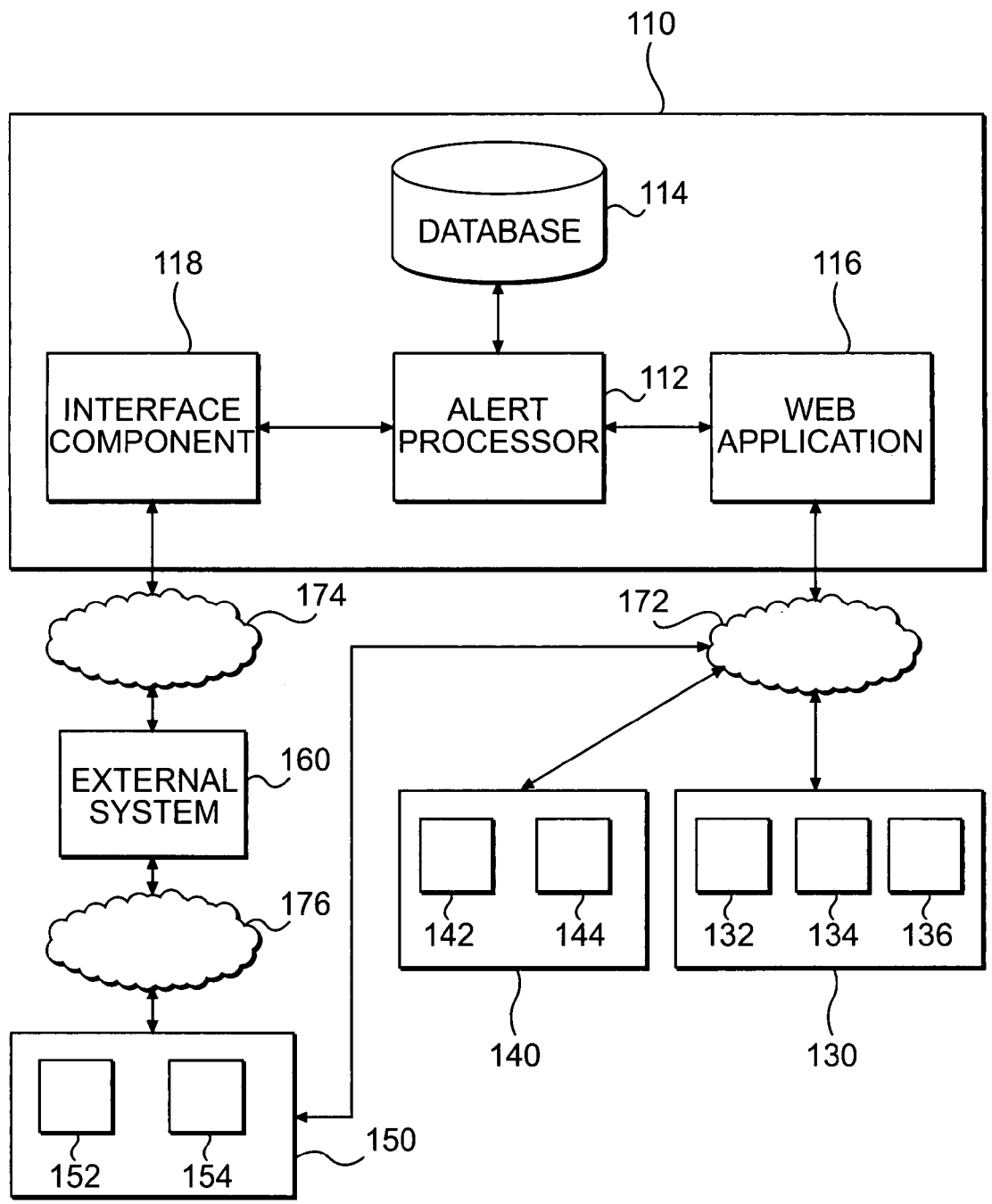
FIG. 1 is a block diagram illustrating an exemplary alert distribution and management system incorporating interface components consistent with embodiments of the present invention.

FIG. 1 illustrates an exemplary alert distribution and management system 110 incorporating interface component 118. As shown in FIG. 1, system 110 may include alert processor 112, database 114, web application 116, and interface component 118. Alert processor 112, database 114, web application 116, and interface component 118 may include any number of computers, devices, hardware, and/or mainframe located anywhere and distributed among multiple locations. Alert processor 112, database 114, web application 116, and interface component 118 may also include operating systems, such as Microsoft Windows™, or any UNIX derived operating system, such as Linux®, Solaris™, and FreeBSD.

Alert processor 112 may perform alert distribution and management functionality, such as alert collection, distribution, management, and coordination assignment. For example, Alert processor 112 may enable establishing accounts for new alert subscribing entities, and enable obtaining, enhancing, and distributing alerts to alert subscribing entities. To this end, alert processor 112 may perform alert collection and distribution process 200 and alert management and coordination assignment process 300, as described in more detail with respect to FIGS. 2 and 3, respectively.

Database 114 may include a database management system (DBMS). The DBMS may store and retrieve data from, and manage database 114. To this end, the DBMS may provide services such as transactions and concurrency, indexing, security, and backup and replication. The DBMS may be based on, for example, a relational model, object database model, post-relational database model, hierarchical model, or flat model. In certain embodiments, a DBMS may be implemented as Oracle™ DBMS, IBM's DB2™, Microsoft SQL Server™, PostgreSQL, or MySQL®.

Database 114 may also include a collection of data related to alert collection, distribution, management, and coordination assignment. For example, database 114 may store any data necessary for alert processor 112 to operate and provide its functionality. To this end, database 114 may include any data involved in alert collection and distribution process 200 and alert management and coordination assignment process 300, as described in more detail with respect to FIGS. 2 and 3, respectively.

Web application 116 may include a web server. The web server may accept hypertext transfer protocol (HTTP/HTTPS) requests from users, such as users 132, 134, 136, 142, 144, 152, and 154 through network 172, and send HTTP/HTTPS responses back to the users with web pages, which may comprise hypertext markup language (HTML) or extensible markup language (XML) documents and any linked or embedded objects, such as images. For example, the web server may exchange XML-based messages with the users using Simple Object Access Protocol (SOAP) on top of HTTP/HTTPS. In certain embodiments, the web server may be implemented as Apache HTTP Server™, Internet Information Service (IIS)™, Sun Java System Web Server™, or IBM HTTP Server™.

In certain embodiments, web application 116 may include an application server that enables dynamic generation of web pages. For example, web application 116 may employ Java Enterprise Edition (JEE) technologies, such as Java Server Page™ (JSP) and Java Servlet™, to enable dynamic generation of web pages, and a J2EE application server, such as IBM's WebSphere™, BEA's WebLogic™, JBOSS™, and JRun™, may be implemented as an application server to support the technologies. Web application 116 may alternatively employ Microsoft.NET Framework™, such as ASP-.NET™ to enable dynamic generation of web pages.

Web application 116 may function as a user interface to alert processor 112 or of system 110, and expose the functionalities of alert processor 112 to users 132, 134, 136, 142, 144, 152, and 154. To this end, web application 116 may present web pages to the users, receive requests originated from the web pages by the users' actions, and repackage and/or relay the requests to alert processor 112 in the format understandable by alert processor 112. After alert processor 112 finishes processing the requests, web application 116 may receive results from the processing, generate web pages with the results, and present the web pages to the users. Web application 116 and exemplary web pages generated and presented by web application 116 are described in more detail with respect to FIGS. 4A-4C.

Alert subscribing entities 130, 140, and 150 may subscribe to system 110 for alerts, and may access system 110 using web application 116, as shown in FIG. 1. Alert subscribing entities 130, 140, and 150 may be any organization that may receive, manage, and/or respond to alerts using system 110. For example, alert subscribing entities 130, 140, and 150 may be hospitals or medical centers, and may receive product recall alerts in biomedical devices, blood products, children's consumer product such as toys, food, laboratory products, medical supplies, pharmaceutical products, radiology products, tissues and organs, engineering and facilities related products and devices, and healthcare related hardware and software. In certain embodiments, alert subscribing entities 130, 140, and 150 may include a number of facilities, and each facility may receive alerts that may be relevant to its functions only. For example, a facility with a pharmacy department may be interested in receiving product recall alerts in pharmaceutical products while a facility without a pharmacy department may not.

Alert subscribing entities 130, 140, and 150 may employ any number of users that may manage and respond to alerts. In certain embodiments, alert subscribing entity 130 may employ users 132, 134, and 136, alert subscribing entity 140 may employ users 142 and 144, alert subscribing entity 150 may employ users 152 and 154, as shown in FIG. 1. In certain embodiments, users 132, 134, and 136 may manage and respond to alerts for all facilities within alert subscribing entity 130 while users 142 and 144 may manage and respond to alert for only one facility within alert subscribing entity 140. In certain embodiments, users 132, 134, and 136 may be charged with a single role in managing and responding to alerts while users 142 and 144 may be charged with multiple roles in managing and responding to alerts. For example, user 142 may be charged with a managing role that may require overseeing alert processing within alert subscribing entity 140. User 142 may also be charged with another role, such as an administrating role that may require handling administrative tasks, such as entering data into system 110.

User 134 may be charged with a coordinating role that may require assigning subscribed alerts to a user charged with a responding role. For example, in coordinating subscribed alerts, user 134 may assign a product recall alert to user 136, who may be charged with a responding role. The assignment of the product recall alert may require user 136 to handle the alert, and user 136 may dispose of the recalled product in response. Failure to perform assigned roles may trigger an escalation process as described in greater detail with respect to FIG. 11. Actions that users 132, 134, 136, 142, 144, 152, and 154 may perform through web application 116 may be limited based on the assigned roles.

In certain embodiments where there may be multiple facilities within an alert subscribing entity, a role may be further divided into multiple managing roles to account for the hierarchy within the entity. For example, a managing role within an alert subscribing entity may include an account manager and multiple facilities managers. An account manager may manage all alerts within the alert subscribing entity, and may be responsible for receiving daily summary of alert activities and workflow within the entity. Each facility within the entity may have a facility manager. A facility manager may manage all alerts within one facility, and may be responsible for receiving daily summary of alert activities and workflow within the facility only.

Rather than using web application 116, alert subscribing entity 150 may alternatively receive, manage, and respond to subscribed alerts using external system 160. In certain embodiments, external system 160 may run outside the firewall of system 110, and connect to system 110 using one or more ports that are opened by interface component 118 for external system 160. External system 160 may be any system that may provide alert collection, distribution, management, and/or coordination assignment functionalities but rely on alert processor 112 of system 110 for providing the services. For example, external system 160 may retrieve alert data from system 110, and present the data to users 152 and 154. To this end, external system 160 may include its own user interface to present the retrieved data to users 152 and 154 and to interact with the users. Through its own user interface, external system 160 may customize the obtained alerts for its alert subscribing entities, such as entity 150. In certain embodiments, external system 160 may be developed or customized to provide alert management and coordination assignment services for a specific industry or a specific segment of an industry that may not conveniently use web application 116. By being external to system 110, external system 160 may receive user actions before they may reach system 110. In certain embodiments, external system 160 may modify and/or filter out the user actions in accordance with its own rules that may be more restrictive than ones implemented in system 110. The user interface of external system 160 may be implemented as a web-based application, as described in greater detail with respect to FIG. 7. To this end, external system 160 may include web servers, application servers, and/or databases.

As shown in FIG. 1, interface component 118 may act as a gateway between external system 160 and system 110. To support external systems developed under multiple technologies, interface component 118 may use a Service Oriented Architecture (SOA), and may be implemented using Common Object Request Broker Architecture (CORBA), Web Service, Simple Object Access Protocol (SOAP), Remote Procedure Call (RPC), Distributed Component Object Model (DCOM), or Windows Communication Foundation (WCF). Interface component 118 is described in more detail with respect to FIG. 5.

Networks 172, 174, and 176 may be any type of communication mechanism and may include, alone or in any suitable combination, a telephony-based network, a local area network (LAN), a wide area network (WAN), a dedicated intranet, wireless LAN, the Internet, an Intranet, a wireless network, a bus, or any other communication mechanisms. Further, any suitable combination of wired and/or wireless components and systems may provide networks 172, 174, and 176. Moreover, networks 172, 174, and 176 may be embodied using bidirectional, unidirectional, or dedicated communication links.

Figure 2:
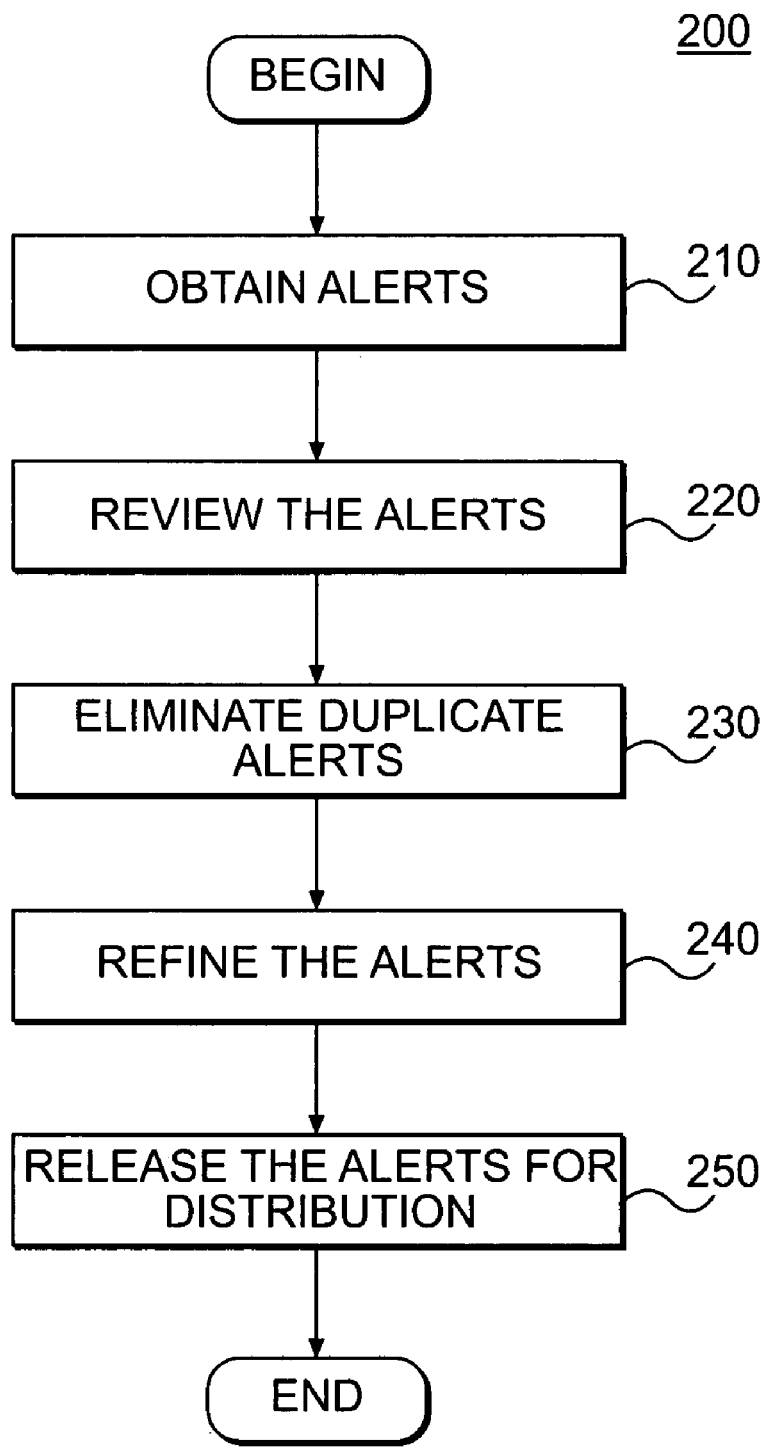
FIG. 2 is a flow diagram illustrating an exemplary alert collection and distribution process consistent with embodiments of the present invention.

FIG. 2 illustrates an exemplary alert collection and distribution process 200. System 110 may obtain alerts from multiple sources (step 210). For example, system 110 may obtain alerts from websites or other systems. System 110 may monitor the websites and other systems, and obtain alerts automatically when triggering events occurs. System 110 may also receive alerts from manufacturer recall notices. System 110 may further receive alerts from its alert subscribing entities, such as entities 130, 140, and 150. Once obtained, the alerts may be reviewed, for example, by a quality control staff, or automatic review process (step 220). Upon reviewing the alerts, the reviewer may delete duplicate alerts (step 230). System 110 may edit remaining alerts to enhance the quality of alert content (step 240). For example, system 110 may add additional information to clarify alerts. The alerts may then be put into a standard format with a consistent set of data elements, and released for distribution to alert subscribing entities (step 250). In certain embodiments, the released alerts may be filtered so that only desired alerts may reach each facility within the alert subscribing entities.

Figure 3:
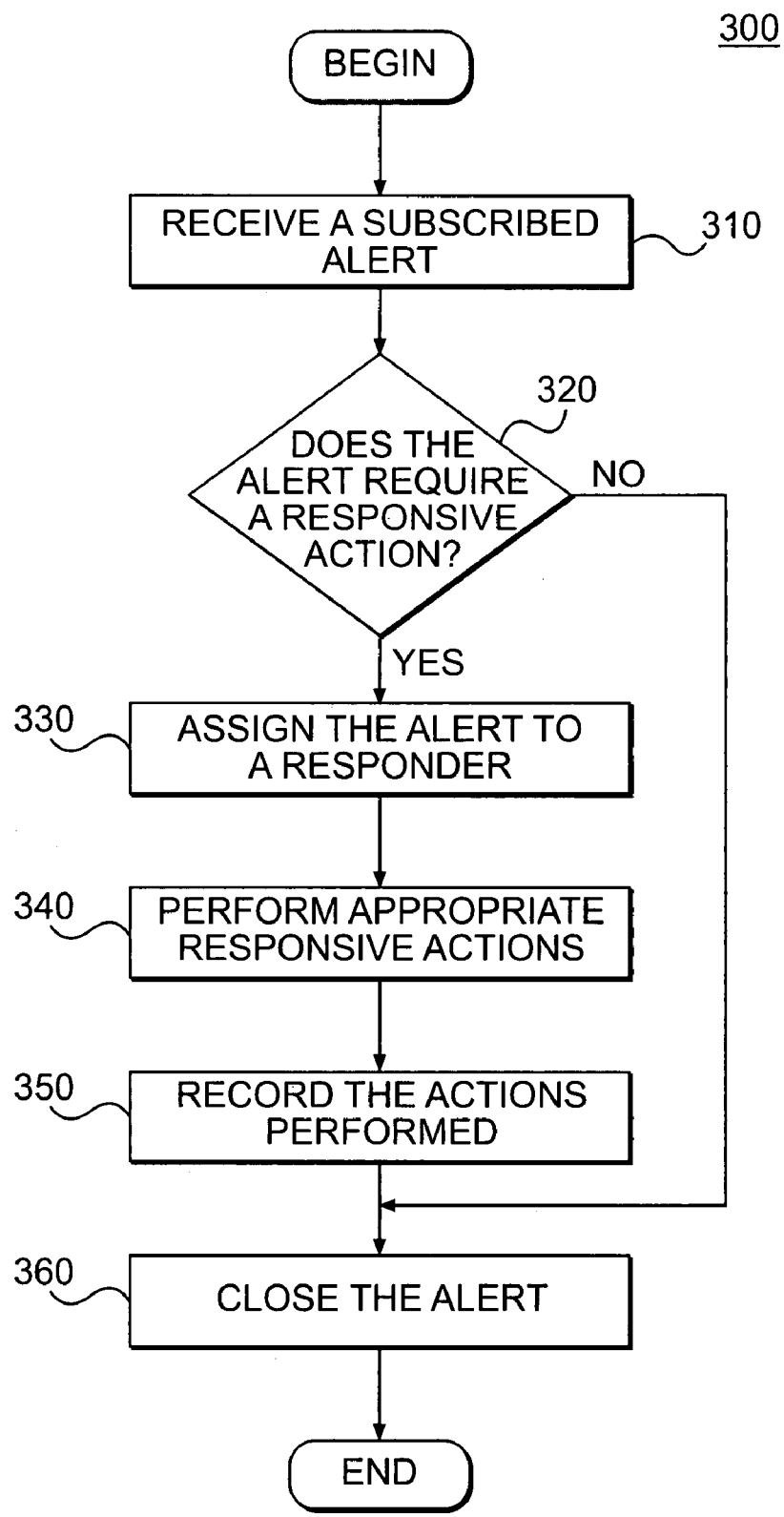
FIG. 3 is a flow diagram illustrating an exemplary alert management and coordination assignment process consistent with embodiments of the present invention.

FIG. 3 illustrates an exemplary alert management and coordination assignment process 300. Each facility within alert subscribing entities 130, 140, and 150 may receive a subscribed alert (step 310). A user charged with a coordinating role, such as user 134, may review the subscribed alert to determine whether it requires a responsive action (step 320). Upon review, if user 134 determines that the alert requires no further action (step 320 "No"), user 134 may close the alert (step 360). If user 134 determines that the alert requires a responsive action (step 320 "Yes"), user 134 may assign the alert to a user charged with a responding role, such as user 136 (step 330). User 136 may perform a task or tasks in response to the alert (step 340). For example, user 136 may dispose of any recalled products in response to a product recall alert. After user 136 completes the task(s), user 136 may record actions performed in system 110, e.g., by using web application 116 (step 350). User 134 may then close the alert (step 360). In certain embodiments, users may be notified by an e-mail at the completion of the step. For example, when the responding user completes an action in response to an alert, the coordinating user may receive an automatic e-mail notification via system 110.

FIGS. 4A-4C depict exemplary screen displays of web application 116 of system 110. A user may log into web application 116 and see a welcome screen, as shown in FIG. 4A. The left column of the welcome screen may display quick links, and the center column of the screen may display alert and recall related news or information. The right column of the screen may display a summary and status of currently open alerts that may require the user's action. For example, for the user "Carl Jones," an alert status shows that the user is a coordinator for five (5) alerts, with zero (0) alerts as a responder or manager. As shown in the legend, colors or other indicators may show delayed or escalated alerts. On the list screen shown in FIG. 4B, the user may see a list of the alerts that may require the user's action. The display may include alert ID with alert release date, alert type, domain, description and manufacturer of the product being alerted, reason for alert, distribution of the alert, alert stage, and alert status. The user may take an action, such as closing the alert, on this screen. On the detailed screen shown in FIG. 4C, the user may see more detailed information about one of the alerts listed on the list screen shown in FIG. 4B. The detailed information may include, in addition to the information shown in the list screen, comments by an alert analyst, source alert type, source type, detailed product information, and work assignments information. One skilled in the art will recognize that web application 116 may contain any number of screens with or without the screens depicted in FIGS. 4A-4C.

Figure 5:
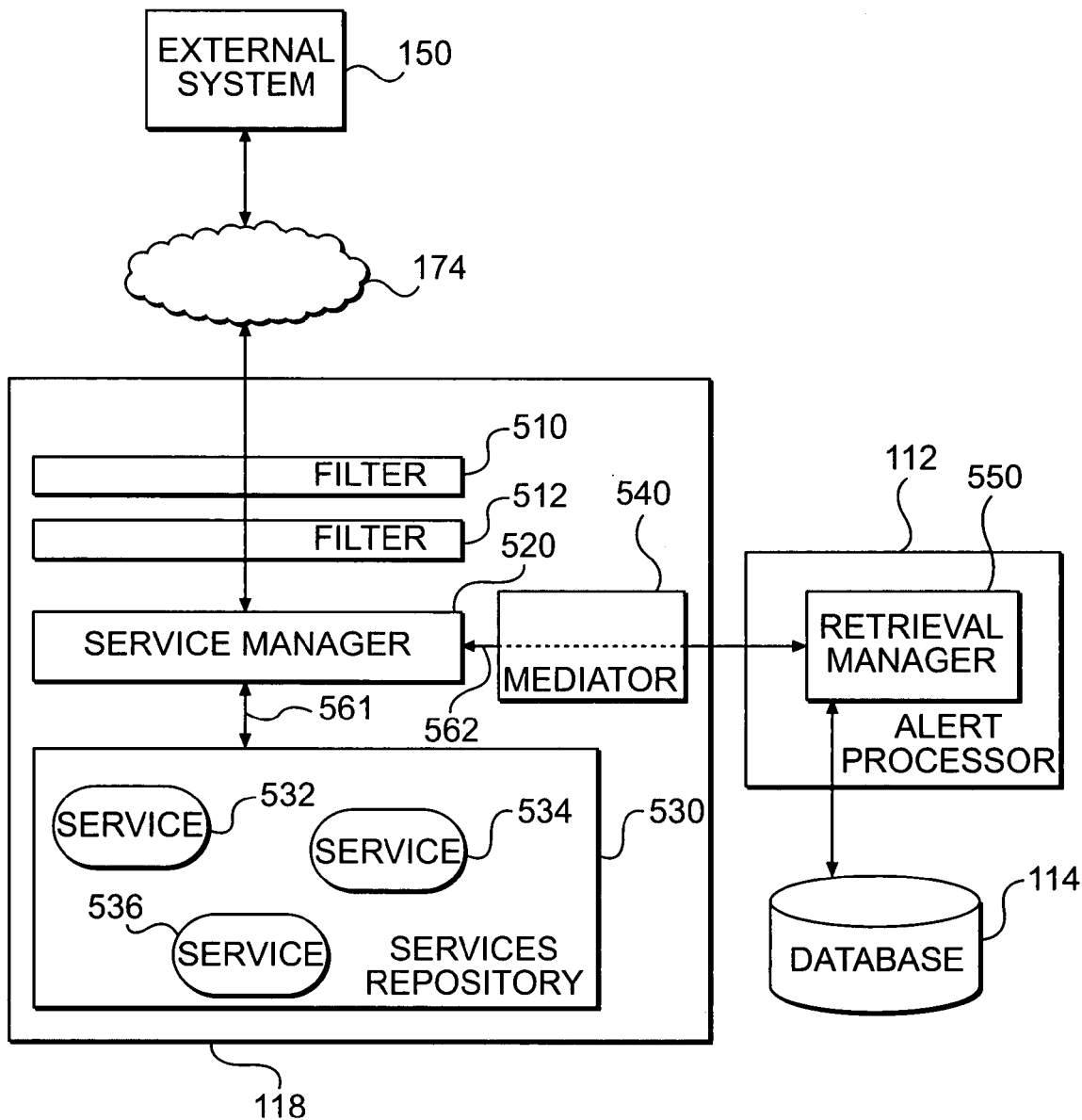
FIG. 5 is a block diagram illustrating interface components consistent with embodiments of the present invention.

FIG. 5 illustrates exemplary interface component 118 in greater detail. There may be instances in which a subscribing entity, such as subscribing entity 150, may find that web application 116 is not best fitted for its organizations. For example, managing an alert in one industry may differ from managing in another. Web application 116 may be developed for general use to serve multiple industries, and thus a user interface offered by web application 116 may not serve specific needs of a particular industry. In such instances, a third party or subscribing entity 150 may develop an external system, such as external system 160, to serve needs of a particular industry. Developers of external system 160 may use and offer the rich functionality and resources of system 110 through external system 160 without having to develop functionality and acquire the resources on its own. By including features that may only be applicable to a particular industry, external system 160 may be customized for the industry.

As shown in FIG. 5, interface component 118 may expose the functionality of alert processor 112 of system 110 by using services 532, 534, and 536 in a service oriented architecture. Each of services 532, 534, and 536 may represent a self-contained, self-describing piece of functionality of alert processor 112 that may be found and accessed by external system 160. Because services 532, 534, and 536 may be self-contained and self-describing, external service 160 can access the services and their functions using just the services. In certain embodiments, services 532, 534, and 536 may be loosely coupled, making connections to the services simpler and more flexible and allowing the developers of external system 160 to understand the services more easily. Although three services 532, 534, and 536 are depicted in FIG. 5, a skilled artisan will recognize that any number of services may be implemented by interface component 118.

Interface component 118 may include services repository 530. Services repository 530 may store services 532, 534, and 536, and may make them available for retrieval by a service manager 520, e.g., when interface component 118 receives a request from external system 160. In certain embodiments, the request from external service 160 may be received via filters 510 and/or 512 before it reaches service manager 520. Filters 510 and 512 may perform preliminary operations, such as extracting username and password from the request in order to authenticate and authorize external system 160. Other commonly recognized authentication and/or authorization mechanisms, e.g., certificate, may also be used. In certain embodiments, any request from external system 160 may be limited by the authentication and authorization of external system 160.

After the request is preprocessed by filters 510 and/or 512, if any, the request may reach service manager 520. In certain embodiments, service manager 520 may perform preprocessing of requests from external system 160. Service manager 520 may retrieve one or more of services 532, 534, and 536 from service repository 530, and invoke at least one service method of the retrieved service, based on the request from external system 160. Examples of the service methods that may be invoked are described in more detail with respect to FIGS. 8A-8C. In certain embodiments, if external system 160 does not have sufficient authorization, certain services and service methods may not be available for retrieval and invocation, respectively. For example, service manager 520 may not retrieve service 532 if external system 160 is authorized to use only services 534 and 536. In another embodiment, availability of services and service methods may depend on whether certain conditions, such as workflow state conditions, have been met. For example, if only service 536 may be retrieved and only a certain service method within service 536 may be invoked after invoking one particular service method according to a current workflow, all other services and service methods may not be available for retrieval and invocation until the certain service of service 536 is invoked.

The invoked service method may trigger sending a request to alert processor 112 in a format understandable by alert processor 112. In certain embodiments, alert processor 112 may include retrieval manager 550, which may include at least one method. The method may be invoked by the service method as a mechanism to send a request to alert processor 112. The method of retrieval manager 550 may retrieve data from database 114, and/or update the data in database 114. In certain embodiments, some data may not be available for retrieval or may not be updated if external system 160 does not have sufficient authorization. For example, a request from external system 160 may not retrieve data that may be particular to other external system (not shown). The retrieved data from database 114 may be sent to service manager 520. Mediator 540 may be used to receive the retrieved data and transform it into a data format understandable by interface component 118. Interface component 118 may prepare and send a response to external system 160. In certain embodiments, filters 510 and 512 may postprocess the response before the response reaches external system 160.

Figure 6:
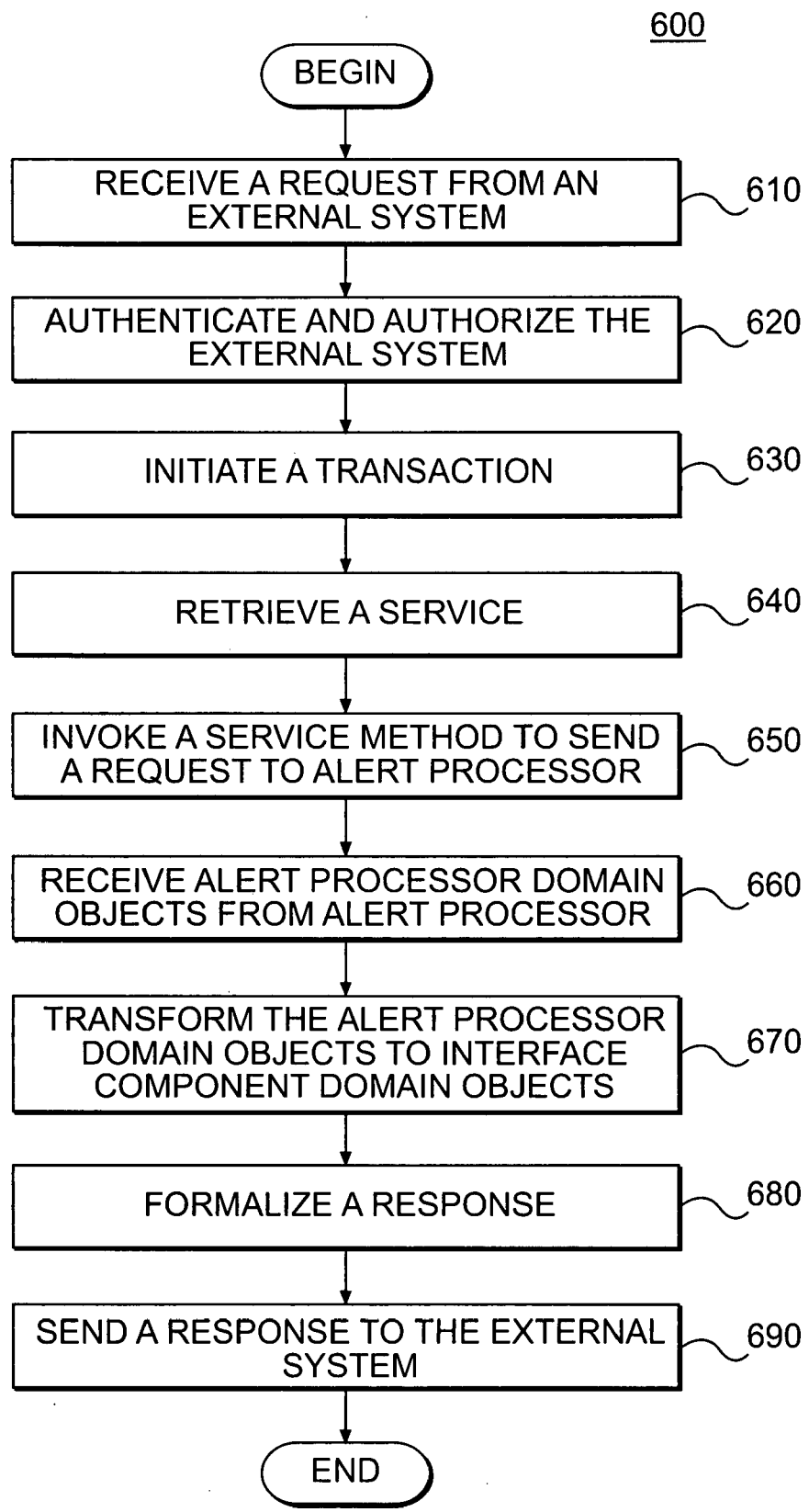
FIG. 6 is a flow diagram illustrating an exemplary alert data retrieval process consistent with embodiments of the present invention.
Figure 9:
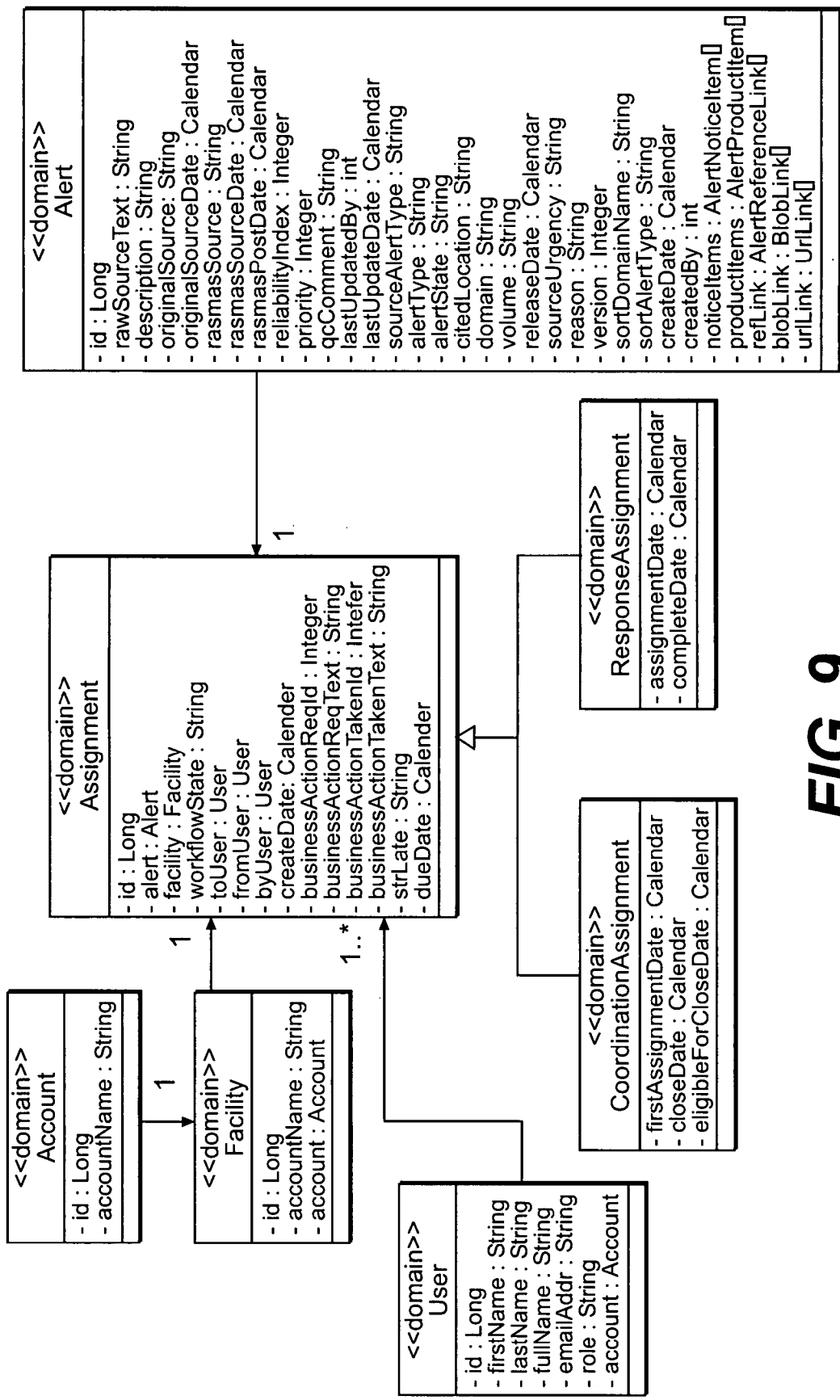
FIG. 9 is a class diagram of exemplary interface components domain objects consistent with embodiments of the present invention.

FIG. 6 illustrates an exemplary alert data retrieval process 600 involving external system 160. The user interface of external system 160 may receive a user action from user 162 or 164, and external system 160 may send a data retrieval request to interface component 118 (step 610). Filters 510 and/or 520 may receive and extract username and password from the request, and authenticate and authorize external system 160 (step 620). Upon successful authentication and authorization, interface component 118 may initiate a transaction or create a session for the request (step 630). To process the request, service manager 520 may retrieve one of services 532, 534, and 536 from service repository 530 (step 640). Service manager 520 may invoke a service method of the retrieved service, which may trigger sending a request to alert processor 112 (step 650). Alert processor 112 may process the request by retrieving data from database 114, and send the retrieved data back to interface component 118 (step 660). Mediator 540 may receive the retrieved data, which may be in form of alert processor domain objects, and transform them into interface component domain objects, which may be understandable by interface component 118 (step 670). In certain embodiments, interface component domain objects may include "Account," "Facility," "User," "Assignment," "CoordinationAssignment," "ResponseAssignment," and "Alert," as shown in FIG. 9. The retrieved service may formalize a response from the transformed data (step 680). Interface component 118 may send the response to external system 160 (step 690). The response may be received by filters 510 and 520 for postprocessing.

FIG. 7 depicts a screen display of an exemplary web-based user interface of external system 160. More particularly, FIG. 7 depicts a screen that displays details of an alert similar to the detailed screen of web application 116 shown in FIG. 4C. As shown in FIG. 7, users 162 and 164 may not be aware of external system 160's dependence on system 110 for alerts, related data, functionality, and resources. The user interface of external system 160 may have customized menus and/or toolbars. The functions and tasks that may be performed by the menus and/or toolbars may be specific to external system 160 and may not be available in web application 116. One skilled in the art will recognize that the user interface of external system 160 may contain any number of screens with or without the screen depicted in FIG. 7.

FIGS. 8A-8C depict class diagrams of an exemplary service objects available in interface component 118 for external system 160. Service objects in interface component 118 may include services 532, 534, and 536. Services 532, 534, and 536 may be instances of classes that may implement the <<service>> interface. As shown in FIG. 8A, RasmasWSMgr class may implement the <<service>> interface, and in certain embodiments, service 532 may be an instance of RasmasWSMgr class. Similarly, as shown in FIGS. 8B and 8C, RasmasWSUserMgr class and RasmasWSAccountMgr class may implement the <<service>> interface, and in certain embodiments, services 534, and 536 may be an instance of RasmasWSUserMgr class and RasmasWSAccountMgr class, respectively. Services 532, 534, and 536 may include any number of service methods, which may be invoked by external system 160.

Service 532, as an instance of RasmasWSMgr class, may include service methods, such as "getAlert," "getAlerts," "searchAlerts," "getCoordinationAssignment," "getCoordinationAssignments," "reassignCoordinationAssignment," "makeResponseAssignment," "completeResponseAssignment," "closeCoordinationAssignment," and "addNote," as shown in FIG. 8A. Service method "getAlert" may return an Alert object, which may be an interface component domain object as shown in FIG. 9. An Alert object may be a representation of a real world alert collected in system 110, and may include any data attributes associated with the alert. Service methods "getAlerts" and "searchAlerts" may return multiple Alert objects, but service method "searchAlerts" may also allow external system 160 to search against all alerts based on a search string. Service method "getCoordinationAssignment" may return a CoordinationAssignment object, which may be another interface component domain object as shown in FIG. 9. A CoordinationAssignment object may be an extension of an Assignment object, and may include any data attributes related to assignment of an alert associated with the CoordinationAssignment object to a user charged with a coordinating role. Service method "getCoordinationAssignments" may return multiple CoordinationAssignment objects.

Service method "reassignCoordinationAssignment" may allow external system 160 to request reassignment of the alert, e.g., to another user to be designated as a coordinator for an alert. Service method "makeResponseAssignment" may allow external system 160 to assign an alert associated with the ResponseAssignment object to a user charged with a responding role. The service method may create a ResponseAssignment object, which may be an interface component domain object as shown in FIG. 9. A ResponseAssignment object may be another extension of an Assignment object. Service method "completeResponseAssignment" may allow external system 160 to notify system 110 of completion of any action required for responding to the assigned alert. Service method "closeCoordinationAssignment" may allow external system 160 to close the coordination assignment. Service method "addNote" may allow external system 160 to add a note to a CoordinationAssignment object.

Service 534, as an instance of RasmasWSUserMgr class, may include service methods, such as "createUser," "disableUser," "changePassword," "changeRole," "getUser," and "getUsers," as shown in FIG. 8B. Service method "createUser" may allow external system 160 to create a user in system 110. For example, alert subscribing entity 150 may desire to hire additional employee to manage and respond to alerts. In certain embodiments, entity 150 may provide information regarding the new employee to external system 160 in order to give the new employee an access to external system 160. In response, external system 160 may make a request to interface component 118 by invoking service method "createUser" to create a new user in system 110.

Service method "disableUser" may allow external system 160 to disable a user in system 110. For example, user 154 may no longer be employed by subscribing entity 150 to manage and respond to alerts, and entity 150 may want to prevent user 154 from accessing external system 160. In certain embodiments, external system 160 may accomplish this task by invoking service method "disableUser." External system 160 may disable only the users that are associated with external system 160. For example, external system 160 may disable user 154 but may not disable user 144 by invoking "disableUser."

Service method "changePassword" may allow external system 160 to change a password of a user, such as users 152 and 154, for accessing system 110. Similarly, service method "changeRole" may allow external system 160 to change a role that a user, such as users 152 and 154, is charged with. Service method "getUser" may return a User object to external system 160. A user object may be a representation of a user, such as users 152 and 154. Service method "getUsers" may return all User objects associated with external system 160. For example, service method "getUsers" may return User objects representing users 152 and 154.

Service 536, as an instance of RasmasWSAccountMgr class, may include service methods, such as "setFacilityDomainRouting," "setAccountEscalationParameter," "updateDesignatedAccountManager," and "updateDesignateFacilityManager," as shown in FIG. 8C. Service method "setFacilityDomainRouting" may allow external system 160 to modify which user may receive new alerts. For example, service method "setFacilityDomainRouting" may allow external system 160 to specify a new coordinator who will receive new alerts for a specific domain at a facility. In certain embodiments, service method "setFacilityDomainRouting" may allow external system 160 to enable or disable a specific domain at a facility. Service method "setAccountEscalationParameters may allow external system 160 to manage an escalation process, as described in more details with respect to FIG. 11. For example, service method "setAccountEscalationParameters may allow external system 160 to adjust the number of days that a user must perform an assigned task before triggering escalation.

Service method "updateDesignatedAccountManager" may allow external system 160 to update which user will be charged with a role of an account manager for an alert subscribing entity. For example, external system 160 may designate user 152 as an account manager for alert subscribing entity 150 using service method "updateDesginatedAccountManager." User 152, as an account manager, may manage all alerts within alert subscribing entity 150, and may be responsible for receiving daily summary of alert activities and workflow within entity 150. Service method "updateDesignatedFacilityManager" may allow external system 160 to update which user will be charged with a role of a facility manager for a facility within an alert subscribing entity. For example, external system 160 may designate user 154 as an facility manager for one facility (not shown in FIG. 1) within alert subscribing entity 150 using service method "updateDesignatedFacilityManager." User 154, as a facility manager, may manage all alerts within the facility in entity 150, and may be responsible for receiving daily summary of alert activities and workflow within the facility.

FIG. 9 depicts a class diagram of exemplary interface component domain objects. In certain embodiments, interface component domain objects may be any instances of Assignment, CoordinationAssignment, ResponseAssignment, Alert, Account, Facility, and User classes shown in FIG. 9. In certain embodiments, interface component domain objects may include any number of data attributes. An interface component domain object may include an "id" attribute, which may identify the object and allow the object to be indexed and searched. An interface component domain object may also include a reference attribute, which may associate the object with other interface component domain object. For example, an Assignment object may include an "alert" attribute, which may associate the Assignment object with an Alert object referenced in the "alert" attribute.

Figure 10:
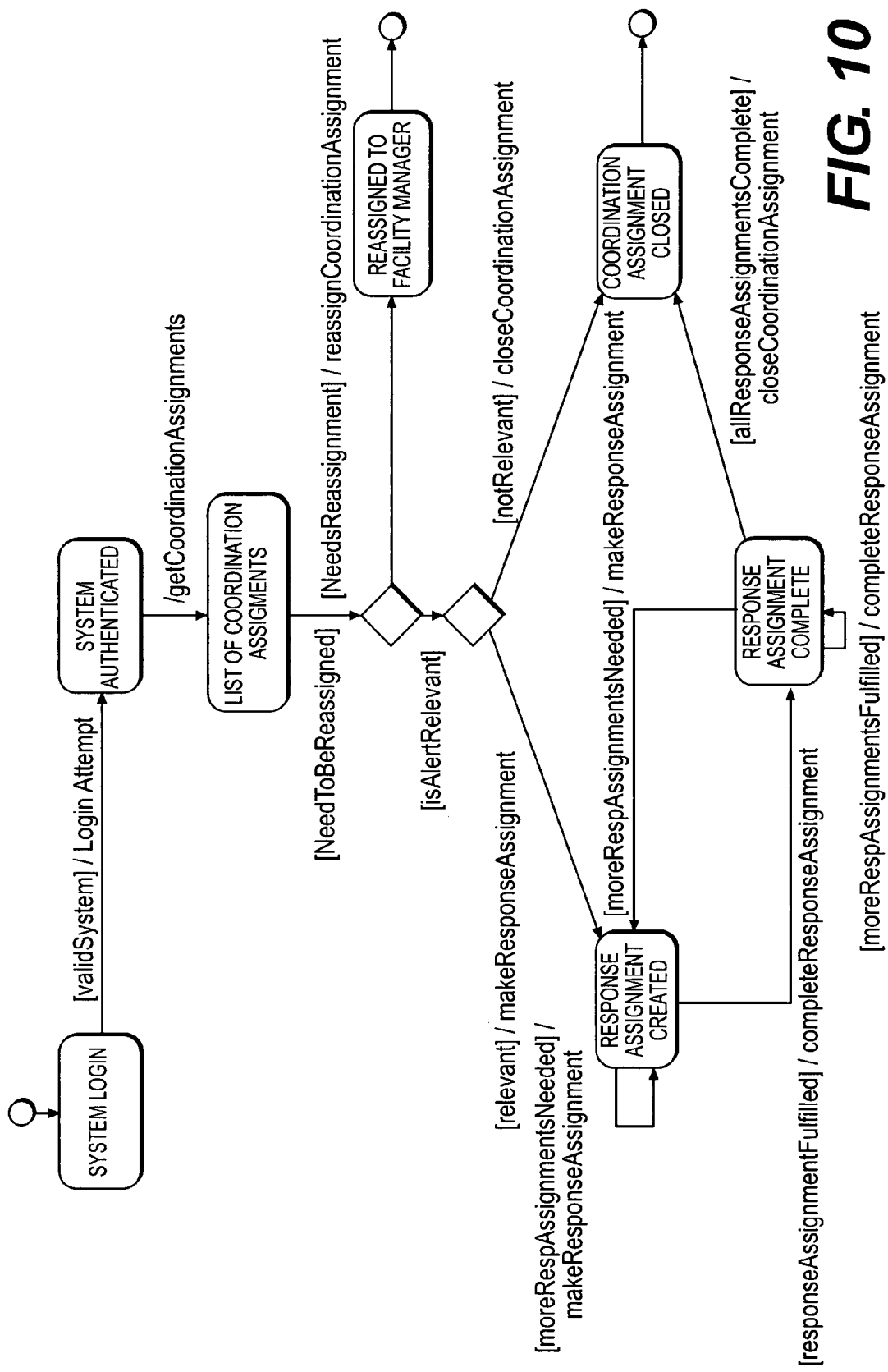
FIG. 10 is an activity diagram of exemplary coordination workflow in an alert distribution and management system consistent with embodiments of the present invention.

FIG. 10 depicts an exemplary activity diagram of coordination workflow in system 110 involving interface component 118. The top of the diagram depicts "System login" in which external system 160 may log into system 110 via interface component 118. Once external system 160 is authenticated and/or authorized, service 532 may be retrieved, and service method "getCoordinationAssignment" of the service may be invoked. As described above with respect to FIG. 8, service method "getCoordinationAssignment" may return a list of CoordinationAssignment objects. External system 160 may loop through the list and determine if any of the CoordinationAssignment objects may need to be reassigned. For any object that needs reassignment, external system 160 may invoke service method "reassignCoordinationAssignment," and the object may be reassigned to Facility Manager as shown in FIG. 10. For those CoordinationAssignment objects that do not require reassignment, external system 160 may determine whether an Alert object associated with each of the remaining CoordinationAssignment objects may be relevant. Relevancy may depend on whether a further action may be required for the alert. If external system 160 determines that an alert object is not relevant, external system 160 may invoke service method "closeCoordinationAssignment" to close the CoordinationAssignment object. If external system 160 determines that an alert object is relevant, external system 160 may invoke service method "makeResponseAssignment," which may create a ResponseAssignment object. After the required action for the assigned alert is performed, external system 160 may invoke service method "completeResponseAssignment" to notify the system 110 of the completion of the required action. External system 160 may then invoke service method "closeCoordinationAssignment" to close the CoodinationAssignment object. A skilled artisan will recognize that other workflows maybe implemented using the methods and systems described herein.

Figure 11:
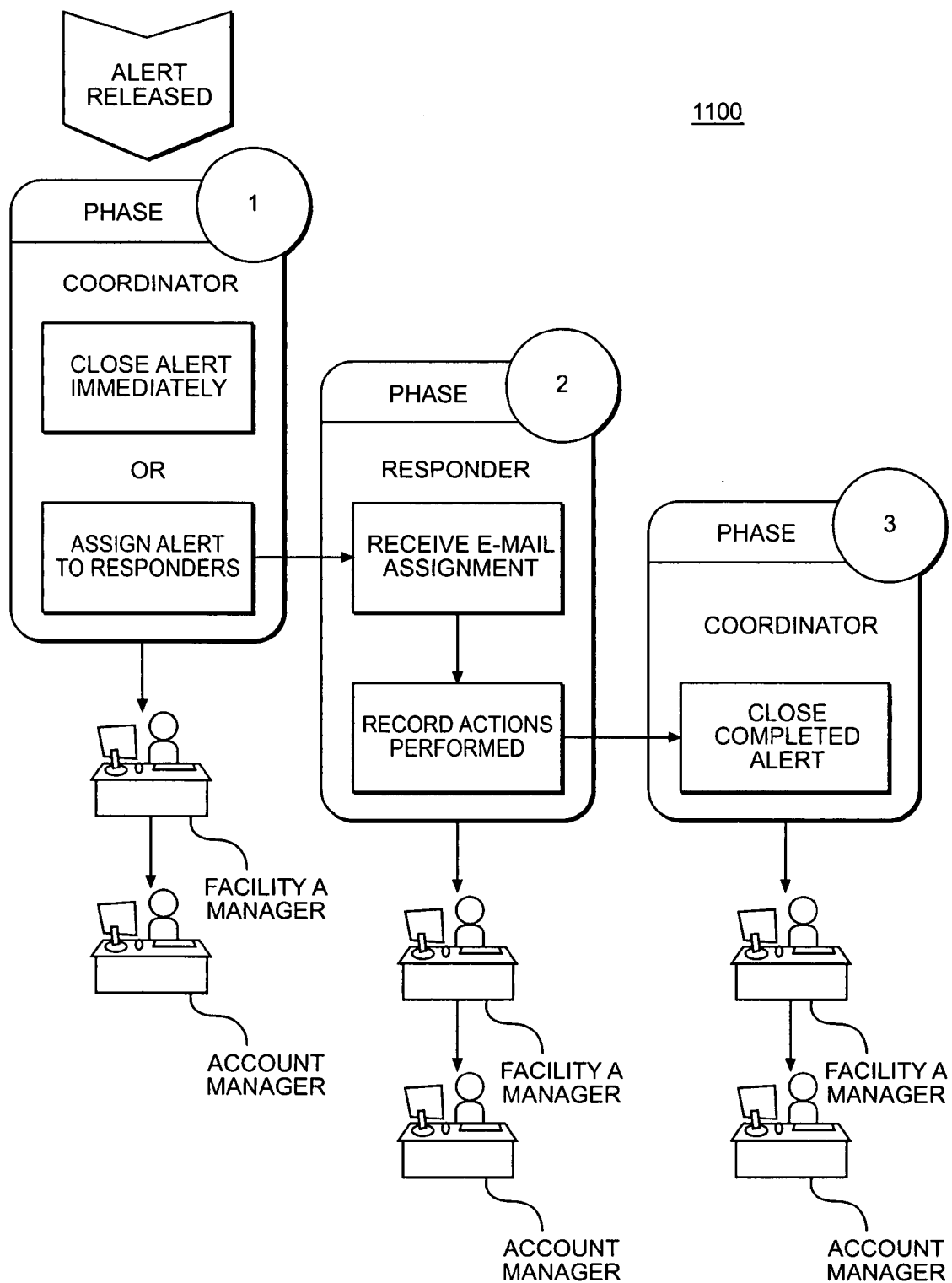
FIG. 11 is a block diagram illustrating an exemplary alert escalation process consistent with embodiments of the present invention.

FIG. 11 depicts an exemplary alert escalation process 1100. As shown in FIG. 11, process 1100 may comprise three phases. Phase 1 depicts a stage in alert management and coordination process 300 where an alert has been released to an alert subscribing entity. A coordinator who is assigned to the alert may have a specified number of days to take an action, for example by closing the alert or assigning the alert to a responder to handle the alert. In cases where the coordinator fails to take any action within the specified number of days, the alert may be escalated to a facility manager as shown in FIG. 11. The facility manager may have a specified number of days to take an action, for example by reminding the coordinator of the alert or reassigning the alert to a different coordinator. If the facility manager fails to take an appropriate action within the specified number of days, the alert may be escalated to an account manager.

Phase 2 depicts a stage in alert management and coordination process 300 where the alert has been assigned to a responder. The responder has a specified number of days to take an action to handle the alert, for example by disposing of alerted products and/or returning alerted products to a manufacturer, and record the actions performed. In cases where the responder fails to take an appropriate action within the specified number of days, the alert may be escalated to a facility manager as shown in FIG. 11. Similar to Phase 1, the facility manager may have a specified number of days to take an action. If the facility manager fails to take an appropriate action within the specified number of days, the alert may be escalated to an account manager.

Phase 3 depicts a stage in alert management and coordination process 300 where the alert has been handled by a responder and the action performed has been recorded. The coordinator who is assigned to the alert has a specified number of days to close the alert. In cases where the coordinator fails to close the alert within the specified number of days, the alert may be escalated to a facility manager as shown in FIG. 11. The facility manager may have a specified number of days to take an action. Failure to taken an action by the facility manager may escalate the alert to an account manager.

One of ordinary skill in the art will recognize that while the drawings illustrate the above steps in a particular order, the order in which the steps are carried out is irrelevant. Systems consistent with the invention may carry out the steps in any order or in some cases omit one or more steps without departing from the scope of the present disclosure.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for distributing product alert information among a plurality of facilities, the method comprising:
   receiving, by a processor, alerts related to products;
   processing, by the processor, the alerts into an alert repository;
   providing, to an external system, an interface component providing one or more services corresponding to one or more operations of the processor, the external system hosted outside a firewall of the processor and the alert repository and accessed by a facility having one or more of the products, the external system communicating with the processor by requesting one or more services of the interface component corresponding to one or more operations of the processor;
   receiving, by the interface component, a request from the external system for a service for retrieving data associated with an alert related to a product at the facility;
   preprocessing the request by the interface component;
   retrieving the service corresponding to the request;
   retrieving, by the processor, escalation parameters corresponding to the alert and including, for each alert, a first number of days within which a coordinator must assign the alert to a responder or close the alert, a second number of days within which the responder must take an action to handle the alert, and a third number of days within which the coordinator must close the alert after the alert has been handled by the responder, wherein each of the first, second, and third number of days for each alert is adjustable by the external system;
   mediating the retrieved data by the interface component; and
   sending, by the interface component, the escalation parameters and the mediated data to the external system, wherein the external system;
   processes the mediated data;
   implements an escalation process using the escalation parameters, wherein the escalation process includes alerting a manager when the coordinator does not assign or close the alert within the first number of days, the responder does not handle the alert within the second number of days, or the coordinator does not close the alert within the third number of days after the alert has been handled by the responder; and
   generates a report for the facility.

2. The method of claim 1, wherein the receiving, by a processor, the alerts related to products further comprises:
   receiving the alerts from multiple sources.

3. The method of claim 1, wherein processing further comprises:
   removing a duplicate from the received alerts,
   standardizing the received alerts, and
   storing the standardized alerts in the alert repository.

4. The method of claim 3, wherein the sending further comprises:
   enabling the external system to customize the mediated data for the facility.

5. The method of claim 1, wherein the external system is accessed by the plurality of facilities, and the external system customizes the mediated data for each of the plurality of facilities.

6. The method of claim 1, wherein preprocessing the request comprises authenticating and authorizing the request, and wherein the interface component filters out the request if the authenticating fails, and data available for retrieval is limited by the authorizing.

7. The method of claim 1, wherein retrieving the data associated with the alert related to the product from the alert repository further comprises using the service to request a corresponding operation of the processor.

8. The method of claim 1, wherein mediating the retrieved data comprises
   transforming the retrieved data into a form corresponding to the external system.

9. A method for managing product alert handling at a facility, the method comprising:
   maintaining, by an alert processor, a database including data related to alert handling at the facility;
   providing, to an external system, an interface component providing one or more services corresponding to one or more operations of the alert processor, the external system hosted outside a firewall of the alert processor and the database and accessed by a facility having one or more products, the external system communicating with the alert processor by requesting one or more services of the interface component corresponding to one or more operations of the alert processor;
   receiving, by the interface component, a first request from the external system for a first service for retrieving alert handling data related to an alert for the facility;
   preprocessing the request by the interface component;
   retrieving the first service corresponding to the request;
   retrieving the alert handling data from the database;
   mediating the alert handling data by the interface component;
   sending, by the interlace component, the mediated alert handling data to the external system, wherein the external system processes the mediated alert handling data and generates a report for the facility;
   receiving, by the interface component, a second request from the external system for a second service for an alert handling action based on the mediated alert handling data, the second request including escalation parameters, the escalation parameters corresponding to the alert and including a first number of days within which a coordinator must assign the alert to a responder or close the alert, a second number of days within which the responder must take an action to handle the alert, and a third number of days within which the coordinator must close the alert after the alert has been handled by the responder, wherein each of the first, second, and third number of days for each alert is adjustable by the external system;

retrieving the second service corresponding to the second request; and using the second service to implement the alert handling action, wherein the alert handling action includes an escalation process that includes alerting a manager when the coordinator does not assign or close the alert within the first number of days, the responder does not handle the alert within the second number of days, or the coordinator does not close the alert within the third number of days after the alert has been handled by the responder.

10. The method of claim 9, wherein the alert handling action further comprises one of:

creating an assignment to a user at the facility to handle the alert, reassigning the alert to a different user at the facility, closing an assignment, and updating the database to record a responsive action taken at the facility.

11. The method of claim 10, wherein the first request comprises one of the facility, the assignment, and the alert.

12. The method of claim 9, wherein
the alert handling action further comprises:
facilitating the escalation process using the escalation parameters.

13. The method of claim 9, wherein retrieving the alert handing data further comprises using the first service to request a corresponding operation of the alert processor.

14. The method of claim 9, wherein mediating the alert handling data comprises:

transforming the alert handling data into a form corresponding to the external system.

15. The method of claim 9, wherein sending the mediated alert handling data further comprises:

enabling the external system to customize the mediated alert handling data for the facility.

16. A system for managing product alert handling at a facility, the system comprising:

a processor that maintains a database including data related to alert handling at the facility;

an interface component, providing one or more services corresponding to one or more operations of the processor, that:

receives a first request from an external system for a first service for retrieving alert handling data related to an alert, the external system hosted outside a firewall of the processor and accessed by the facility, the external system communicating with the processor by requesting one or more services of the interface component corresponding to one or more operations of the alert processor;

preprocesses the request;

retrieves the first service corresponding to the first request;

uses the first service to cause the processor to retrieve the alert handling data;

mediates the alert handling data;

sends the mediated alert handling data to the external system, wherein the external system processes the mediated alert handling data and generates a report for the facility;

receives a second request from the external system for a second service for an alert handling action based on the mediated alert handling data, the second request including escalation parameters the escalation parameters corresponding to the alert and including a first number of days within which a coordinator must assign the alert to a responder or close the alert, a second number of days within which the responder must take an action to handle the alert, and a third number of days within which the coordinator must close the alert after the alert has been handled by the responder, wherein each of the first, second, and third number of days for each alert is adjustable by the external system;

retrieves the second service corresponding to the second request; and uses the second service to implement the alert handling action, wherein the alert handling action comprises facilitating an escalation process using the escalation parameters, the process including alerting a manager when the coordinator does not assign or close the alert within the first number of days, the responder does not handle the alert within the second number of days, or the coordinator does not close the alert within the third number of days after the alert has been handled by the responder.

17. The system of claim 16, wherein the alert handling action comprises one of:

creating an assignment to a user at the facility to handle the alert, reassigning the alert to a different user at the facility;

closing an assignment, and updating the database to record a responsive action taken at the facility.

18. The system of claim 16, wherein the interface component mediates the alert handling data by transforming the alert handling data into a form corresponding to the external system.

19. The method of claim 1, wherein the escalation process comprises:

automatically escalating the alert to another user at the facility if a user assigned to the alert fails perform the task related to the product within the number of days.

\* \* \* \* \*